United States Patent Office 3,041,292
Patented June 26, 1962

3,041,292
COMPOSITE ION EXCHANGE RESIN BODIES
Melvin J. Hatch, Midland, Mich., assignor to The Dow Chemical Company, Midland, Mich., a corporation of Delaware
No Drawing. Filed Dec. 13, 1954, Ser. No. 475,003
8 Claims. (Cl. 260—2.1)

This invention concerns new ion exchange resin bodies which are composites of different resins, at least two of which contain ionizable groups or radicals, the resin ingredients of the bodies being intimately blended together in a manner which prevents them from becoming separated from one another during use as ion exchange agents. It pertains especially to solid, composite, ion exchange bodies, each comprising one or more anion exchange resins and one or more cation exchange resins intimately blended together in a manner which prevents them from becoming separated from one another during employment as ion exchange agents and which gives to the composite body certain useful properties not possessed to an appreciable extent by a mechanical mixture of granules of the individual ion exchange resins. The invention also concerns a method of making the composite ion exchange resin bodies.

The composite ion exchange resin bodies of the invention comprise at least one solid resin which possesses a cross-linked, e.g. a three dimensional, molecular structure and which is insoluble in water and in aqueous solutions of acids, bases, or salts. This cross-linked resin ingredient is also usually insoluble in organic solvents such as benzene, toluene, chlorobenzene, carbon tetrachloride, acetone, or alcohol, etc., but insolubility in the organic solvents is not an essential requirement. The cross-linked resin ingredient preferably possesses ionizable groups or radicals such as sulfonate groups, carboxylate groups, amino groups, substituted amino groups, or quaternary ammonium radicals and is, of itself, an ion exchange agent, but it is not essential that it possess ionizable groups or radicals.

The composite bodies of the invention comprise two or more resin ingredients each possessing ionizable groups or radicals and effective, when in insoluble or insolubilized form, as ion exchange agents. Either or all of these ionizable resin ingredients may possess a cross-linked molecular structure, e.g. one or more of these ingredients may, of itself, be an insoluble, cross-linked resin, but this is not essential. One or more of the ionizable resin ingredients may be a linear polymer which, when tested individually, is appreciably soluble in a neutral, acidic, or a basic aqueous medium.

The composite ion exchange resin bodies usually, and preferably, comprise an insoluble, ionizable, cross-linked resin having an ionizable linear polymer intimately associated, i.e. incorporated or blended, therewith. Due apparently to the molecules of the different resins being intertwined, the insoluble, cross-linked resin (whether, of itself, ionizable or not) prevents the linear resin from being dissolved by liquids in which it would otherwise be soluble. Because the otherwise soluble, ionizable resin ingredient is thus insolubilized, it functions as an ion exchange resin. It is not necessary that any of the resin ingredients be individually soluble, e.g. all of such ingredients may individually be insoluble in the liquids to be contacted therewith and all of the resin ingredients may possess cross-linked molecular structures. However, they must be intimately associated, or blended together, as hereinafter described.

Any of the ionizable resin ingredients of the composite bodies may be an anion exchange resin, or a cation exchange resin, or an amphoteric resin. Also, all of the two or more ionizable resin ingredients of the composite bodies may be cation exchange resins, or anion exchange resins, or amphoteric resins. For instance, the composite body may comprise, or consist of, a sulfonated, insoluble, cross-linked copolymer, e.g. of styrene, ethylvinylbenzene and divinylbenzene, having a carboxylated polymer, such as polyacrylic acid, intimately associated, and presumably molecularly entangled, therewith. Such a composite body comprising two different kinds of cation exchange radicals is well adapted for use in ion exchange processes for the softening or demineralization of water wherein it is desired to regenerate the used ion exchange material in part with a soluble salt such as sodium chloride and in part with a strong mineral acid so as to decompose any carbonates or bicarbonataes associated therewith. Similarly, the composite body may comprise, or consist of, a strongly basic, insoluble, cross-linked copolymer, e.g. a copolymer of styrene, ethylvinylbenzene, and divinylbenzene containing quaternary ammonium radicals, having a weakly basic anion exchange resin, such as a resinous condensation product of phenol, formaldehyde and diethylenetriamine, molecularly entangled therewith. Numerous other possible variations in the composition of the composite ion exchange resin bodies will be evident from the illustrations just given.

The invention is particularly concerned with composite bodies comprising one or more anion exchange resins and one or more cation exchange resins intimately associated as hereinafter described. At least part of the ionizable radicals of the two types of resins just mentioned are capable, when the resins are in their respective basic and acidic forms, of neutralizing one another, but the two types of resins are otherwise not chemically combined, i.e. they are not connected by carbon to carbon linkages or by any other kind of non-ionizable linkage therebetween. Because the two types of resins are in intimate physical association with one another in a single solid body comprising the same, and apparently are molecularly entangled in a body comprising an insoluble cross-linked resin (which may be different from, or may be either or both of, the ionizable resins just mentioned) a small and restricted, or limited, movement of ionizable groups of one of the resins with respect to ionizable groups of the other resin is theoretically possible. On a probability basis, the basic groups of the anion exchange resin and the acidic groups of the cation exchange resin would seldom, if ever, all be paired together in direct contact with one another when the entangled resins are in their individually natural, i.e. relaxed, condition. However, the above-mentioned limited movement between the entangled resins should permit a substantial portion of the basic groups of the anion exchange resin to be neutralized by acidic groups of the cation exchange resin, or vice versa, when the resins are brought to their respective basic and acidic forms. The partial or complete neutralization of one of the resins by the other, involving a limited movement between the entangled resins, would theoretically result in a condition of strain, or tension, in the composite body. This strain or tension, although presumably quite small, i.e. not sufficient to cause disintegration of the composite body, should facilitate cleavage of many of the resulting inter-resin salt groups, for instance by chemical absorption of anions, or cations, or both, from soluble ionizable compounds present in liquids which are subsequently contacted with the composite body. Conversely, the fact that the entangled cation and anion exchange resins are capable of forming a salt with one another should facilitate release of chemically absorbed anions and cations from the composite body to a surrounding liquid such as water.

Although the invention is not restricted thereto, the above theory as to the structure of the composite ion exchange bodies accords with, and is supported by, properties which the composite bodies have been found to possess. For instance, polyacrylic acid alone is soluble in aqueous alkali metal hydroxide solutions, but the polyacrylic acid intimately associated with an insoluble cross-linked resin, e.g. with a sulfonated copolymer of styrene, ethylvinylbenzene and divinylbenzene, as a single composite body of both resins prepared in accordance with the invention, is not dissolved or leached from the composite body by aqueous alkali metal hydroxide solutions. This fact, and the further fact that these particular resins are non-reactive with one another, indicates that the resins are molecularly entangled. The composite bodies comprising an anion exchange resin and a cation exchange resin have a property of absorbing a salt, such as sodium chloride, sodium bromide, potassium chloride, sodium sulfate, potassium sulfate, or calcium chloride, etc., from aqueous solutions thereof and a further property of releasing a substantial portion of the absorbed salt upon being washed with water or other suitable liquids. The last mentioned composite bodies are also capable of absorbing cations from aqueous alkali solutions, or of absorbing anions from aqueous acid solutions, and of releasing at least a portion of the absorbed ions when washed with water. The displacement of absorbed ions from these composite bodies to regenerate the latter can be accomplished by washing such bodies with liquid water at any temperature above 0° C., e.g. at room temperature. The fact that the composite bodies of anion exchange resins and cation exchange resins are capable of absorbing ions from aqueous solutions and of being regenerated merely by being washed with water is of economic advantage in that it avoids the necessity of employing alkalies, acids, or both, or soluble salts for the regeneration of spent ion exchange resins.

The composite bodies of one or more anion exchange resins and one or more cation exchange resins, which constitute a preferred embodiment of the invention, are effective for ion exchange purposes regardless of the relative proportions of the anion exchange resin and cation exchange resin ingredients thereof. After becoming spent through absorption of ions from an aqueous solution, any of the composite bodies of the invention can, if desired, be regenerated by treatment with a suitable salt or with an aqueous alkali, or an aqueous acid, or both. However, the capacity of a composite body of an anion exchange resin and a cation exchange resin for absorbing neutral salts from aqueous salt solutions and the rate and completeness with which the spent composite body can be regenerated by being washed with water and dependent in part upon the relative proportions of the anion- and cation-exchange resins present in the composite body. The capacity, per pound, of such a composite body to absorb a neutral salt, e.g. sodium chloride, from a salt solution and the rate and extent to which the absorbed salt can be washed therefrom with water to regenerate the body generally are greatest when the body comprises between 0.5 and 2 chemically equivalents of an anion exchange resin per chemical equivalent of a cation exchange resin and decrease as the relative proportions of the ion exchange resins are varied away from this range. The composite bodies of anion exchange resins and cation exchange resins usually contain from 0.3 to 3, advantageously from 0.5 to 2, and preferably about 1, chemical equivalent of anion exchange resin per chemical equivalent of cation exchange resin, but they may contain the resin ingredients in other proportions.

The composite ion exchange resin bodies of the invention are prepared by forming an intimate mixture of a polymer and a polymerizable organic liquid (at least one of which starting materials either contains ionizable groups or contains groups of other kinds, e.g. ester or anhydride groups, that can readily be converted to ionizable groups by hydrolysis or in other known ways) and polymerizing the monomeric material present in the mixture. It is necessary that at least one of the polymer ingredients of the resulting composite solid body be a cross-linked polymer which is insoluble in water and in aqueous solutions of acids, alkalies, or salts. As hereinbefore indicated, the cross-linked polymers are usually insoluble in, but absorptive of, organic liquids. The insoluble cross-linked polymer may be, and usually is, the polymer starting material, but a linear polymer such as solid polystyrene can be used as the polymer starting material and the insoluble cross-linked polymer be formed from a suitable liquid monomeric material, e.g. a mixture of styrene, ethylvinylbenzene, and divinylbenzene, that is intimately admixed therewith. The insoluble cross-linked polymer ingredient is preferably one possessing ionizable groups, such as those hereinbefore mentioned, but this is not required. Its principal function is that of restricting movement, and thus preventing solution or other separation therefrom, of the ionizable polymer or polymers associated therewith. However, the composite bodies of the invention do contain at least two kinds of ionizable resin ingredients. When the cross-linked polymer ingredient is one containing ionizable groups, the composite body comprises the same and one or more other ionizable resins which may possess a linear structure or may also be of a cross-linked molecular structure. When the insoluble, cross-linked polymer ingredient does not contain ionizable groups, it is necessary that at least two ionizable resins be intimately associated, e.g. molecularly entangled, therewith.

Resin ingredients of the composite ion exchange resin bodies may be ordinary polymers or copolymers which may or may not contain ionizable groups and which are formed by an addition reaction between monomer molecules; or condensation polymers of any of the many well-known kinds, which polymers may or may not contain ionizable groups; or derivatives of non-ionizable polymers of either such type which derivatives are formed by the introduction of ionizable groups such as sulfonate groups, carboxylate groups, amino groups, mono- or di-alkyl amino groups, or quaternary ammonium radicals, etc., into the non-ionizable polymer molecules during or after formation of the same. Polymers and copolymers of all of the types just mentioned, and ways of making the same, are well known. Although the composite bodies may comprise a non-ionizable resin ingredient, the invention requires the presence in such body of at least two ionizable resins and at least one insoluble, cross-linked resin which may be one of said ionizable resins, the insoluble, cross-linked resin having the other resins or resins intimately associated, and apparently molecularly entangled, therewith.

Examples of resins, e.g. polymers and condensation polymers, that may be employed as ingredients of the composite bodies are sulfonated polystyrene, sulfonated polyvinyltoluene; sulfonated copolymers of styrene and vinyltoluene; polyacrylic acid; copolymers of styrene and maleic anhydride; sulfonated phenol-formaldehyde resins; resinous condensation products of phenol, formaldehyde, and one or more alkylene or polyalkylene-polyamines such as ethylenediamine, diethylenetriamine, triethylenetetramine, or tetraethylenepentamine; copolymers of styrene and divinylbenzene; copolymers of styrene, ethylvinylbenzene and divinylbenzene; copolymers of styrene, alpha-methylstyrene, ethylvinylbenzene and divinylbenzene; copolymers of vinylxylene and divinylbenzene, sulfonated copolymers of styrene and divinylbenzene; sulfonated copolymers of styrene, ethylvinylbenzene and divinylbenzene; sulfonated copolymers of vinyltoluene, ethylvinylbenzene and divinylbenzene; copolymers of acrylic acid, ethylvinylbenzene and divinylbenzene; copolymers of methacrylic acid, ethylvinylbenzene and divinylbenzene; copolymers of styrene, ethylvinylbenzene and divinylbenzene comprising quaternary ammonium radicals as nuclear substituents; and copolymers of styrene, ethylvinylbenzene and divinylbenzene containing polyalkylpolyamine groups, such as $-CH_2NHCH_2CH_2NH_2$ groups, as nuclear substituents; etc. The invention is particularly concerned with composite ion exchange resin bodies comprising copolymers of a major proportion, e.g. 80 weight percent or more, of one or more monoalkenyl aromatic hydrocarbons and a minor proportion of one or more polyvinyl aromatic hydrocarbons such as divinylbenzene, or divinyltoluene, etc., which copolymers preferably contain ionizable groups as substituents and are, of themselves, effective as ion exchange agents. These copolymers and ionizable derivatives thereof are useful as the insoluble, cross-linked polymer ingredients of the composite resin bodies.

The composite ion exchange resin bodies are preferably prepared by admixing a liquid monomeric material, having in at least some of the molecules thereof groups or radicals that are ionizable or that can readily be converted to ionizable groups, with an insoluble, cross-linked polymer which preferably, but not necessarily, contains ionizable groups and permitting the monomeric material to be absorbed by the polymer. The insoluble polymer may be dry, or may be wet or swollen with an inert liquid such as water or an organic liquid, when contacted with the monomeric material. Also, the liquid monomeric material absorbed by the resin may be in undiluted form or may contain an inert liquid solvent therefore, or other dissolved additives, e.g. plasticizers, lubricants, or a minor amount of a peroxy compound such as sodium or potassium persulfate, tertiary-butyl hydroperoxide, di-(tertiary-butyl) peroxide, or hydrogen peroxide, or other polymerization catalyst, but the catalysts and other additives just mentioned are not required. Also, a catalyst, if desired, can be added after the insoluble, cross-linked polymer has absorbed at least a portion of the monomeric material. Unabsorbed monomeric material, if present, may be washed, drained, or otherwise removed from the thus treated insoluble polymer, which preferably, is in a granular or powdered form. The insoluble, cross-linked polymer is brought to, or maintained at, a temperature such as to convert the absorbed monomeric material to a polymer thereof. The polymerization sometimes occurs at a satisfactory rate at room temperature, especially in instances in which the monomers undergo an addition, rather than a condensation, type of polymerization reaction and a catalyst is present to accelerate the reaction. Often the material is heated, e.g. at from 40° to 100° C. or above, to accomplish the reaction at a fairly rapid rate. The polymerization can be carried out in the presence or absence of a liquid medium. It is usually accomplished while having the granules of cross-linked polymer, containing the absorbed monomeric material, immersed in an inert liquid. The latter may be a solvent for the monomer when the latter is an ionizable material which is reactive with the insoluble, cross-linked polymer to form a salt of the latter. Otherwise the inert liquid medium, if employed, is preferably a nonsolvent for the monomeric material. In instances in which the polymer formed by the reaction is, of itself, soluble in an aqueous or organic liquid, a portion thereof may be washed from the outer portions, or surfaces, of the resulting composite polymer bodies. However, a considerable portion of the polymer thus formed is trapped within, and apparently is molecularly entangled with, the insoluble, cross-linked polymer and is not dissolved, or extracted, from the latter. However, it is available to aqueous liquids contacted with the composite polymer body and is capable of functioning as an ion exchange agent.

If desired, the resulting composite polymer body may be caused to absorb another, and different, liquid monomeric material containing ionizable groups and this absorbed monomeric material may be polymerized to form a second ionizable polymer which also is trapped within, and apparently molecularly entangled with, the insoulble, cross-linked polymer ingredient and is thus insolubilized.

It will be evident, from the foregoing general description, that a variety of composite ion exchange resin bodies, each comprising two or more kinds of ion exchange resins intimately associated with one another, can be made by the method of the invention. Examples of such composite bodies are that of an insoluble, cross-linked copolymer of a major amount of styrene, a minor amount of ethylvinylbenzene and from 0.5 to 12 percent divinylbenzene, which copolymer contains either tetramethylammonium radicals or trimethylethanolammonium radicals as nuclear substituents and is intimately associated with polyacrylic acid; an insoluble, cross-linked copolymer derivative, of either of the kinds just mentioned, intimately associated with polyvinylbenzene sulfonic acid; an insoluble, cross-linked, sulfonated copolymer of styrene, ethylvinylbenzene and divinylbenzene, which copolymer is intimately associated with polyethylenimines; an insoluble, cross-linked sulfonated copolymer of vinyltoluene, ethylvinylbenzene, and divenylbenzene, the copolymer being associated with polyacrylic acid; an insoluble copolymer of the kind last mentioned associated with polyvinylbenzyl trimethylammonium hydroxide; and an insoluble sulfonated phenol-formaldehyde resin associated with polyvinylbenzyl trimethyl ammonium hydroxide, etc.

The following specific examples describe ways in which the invention has been applied and illustrate certain of its advantages, but are not to be construed as limiting its scope.

EXAMPLE 1

This example illustrates the preparation of composite cation exchange resin bodies, each comprising two different cation exchange resins intimately associated with one another. The sodium salt of a nuclear sulfonated copolymer of about 85 weight percent styrene, 7.5 percent ethylvinylbenzene, and 7.5 percent divinylbenzene was used as a starting material in making each of the composite cation exchange resin bodies. It is an insoluble, cross-linked resin sulfonate. It was in the form of a mass of water-wetted beads of from 20 to 50 Tyler screen mesh sizes. In each of two experiments, a 50 ml. bed of the beads wetted with a total of 35 ml. of water (part of which was absorbed in the beads) was treated with 5 drops of monoethanolamine and 5 drops of a 0.1-normal aqueous ferrous ammonium sulfate solution. These two mixtures and the composite resin bodies formed therefrom will be referred to as "A" and "B," respectively. The mixtures A and B were treated with 15 ml. and 25 ml. of acrylic acid, respectively. Each mixture was shaken in a closed vessel at room temperature for 1.5 hours to permit absorption of a considerable part of the acrylic acid by the resin. Air was then flushed from each vessel with nitrogen and 1 ml. of an aqueous 30 weight percent hydrogen peroxide solution was added to each mixture. The vessels were closed, shaken, and permitted to stand. About 20 minutes after adding the hydrogen peroxide, each mixture was found to have warmed spontaneously, indicating that the acrylic acid was undergoing polymerization. The mixtures stood overnight to permit completion of the reaction. Each vessel was then opened and the polymer beads were removed and washed with water. The washings were titrated with a standard sodium hydroxide solution to determine the amount of soluble acid, principally dissolved polyacrylic acid, therein. The amount of polyacrylic acid retained in the beads was calculated by difference. The beads A retained polyacrylic acid in amount corresponding to 9.6 ml. of acrylic acid, i.e. to 64 percent of the acrylic acid employed in making the same. The beads B retained polyacrylic acid in amount corresponding to 11.75 ml. of acrylic acid, or to 47 percent of the acrylic acid employed. Accordingly, each of these products consisted of composite ion exchange resin bodies, i.e. beads, composed of an insoluble, cross-linked resin sulfonate and polyacrylic acid intimately associated with one another. The fact that part of the polyacrylic acid formed in each experiment was dissolved by the wash water and part was retained in the beads and could not be washed therefrom indicates that the polyacrylic acid in the beads is molecularly entangled with the insoluble, cross-linked resin sulfonate ingredient and is thus insolubilized. The beds of the composite resins A and B had volumes of 57 ml. and 58 ml., respectively. Each such bed was treated with aqueous sodium hydroxide to bring both of the cation exchange resin ingredients to the form of sodium salts thereof, then washed with water. Each bed was then treated with sufficient aqueous hydrochloric acid to convert each cation exchange resin ingredient to its acidic form and the bed was again washed with water. Each bed was then tested in conventional manner to determine the amount of sodium hydroxide which was required to convert both of the resin ingredients to sodium salts thereof and to determine the proportions of the acidic groups of the composite resins which are strongly acidic, i.e. sulfonic acid groups, and which are weakly acidic, or carboxylic acid, groups. A procedure for making this determination is to immerse a bed of the beads in an aqueous solution of sodium chloride in excess over the amount theoretically required to react with the beads and to stir and electrometrically titrate the mixture with a standard sodium hydroxide solution. The bed of the granular composite resin A was found to have a total absorptive capacity for sodium ions of 2.43 meq. per ml. of bed volume, the portion of this capacity due to strongly acidic, or sulfonic acid, groups being 1.44 meq./ml. and the portion due to weakly acidic, i.e. carboxylic acid, groups being 0.99 meq./ml. The bed of the granular composite resin B had a total absorptive capacity for sodium ions of 3.30 meq./ml., the portion of this capacity due to sulfonic acid groups being 1.51 meq./ml. and the portion due to carboxylic acid groups being 1.79 meq./ml.

EXAMPLE 2

This example illustrates the preparation of bodies, i.e. granules, of anion and cation exchange resins intimately associated with one another in the individual granules. An insoluble, cross-linked, anion exchange resin in the form of small beads, or rounded granules, was used as a starting material. This anion exchange resin was a copolymer of about 85 weight percent styrene, 7.5 percent ethylvinylbenzene and about 7.5 percent divinylbenzene, modified by containing trimethylethanolammonium acrylate, i.e.

radicals as nuclear substituents. A glass vessel was charged with a 75 ml. bed of the granular anion exchange resin and with sufficient water to fill the voids between the granules. An aqueous acrylic acid solution, formed by diluting 20 ml. of glacial acrylic acid with water to a final volume of 40 ml. was added and the mixture was shaken. To the mixture there were then added 0.6 gram of potassium metabisulfite and 0.6 gram of potassium persulfate. The mixture warmed spontaneously and was cooled with water. Air was displaced from the vessel with nitrogen and the vessel was closed. The vessel and its contents were warmed overnight at 45° C. to polymerize the acrylic acid. The vessel was then opened and the granular resin was removed. An approximately 20 ml. portion of the granular resin was washed slowly with 300 ml. of a 2-normal aqueous sodium hydroxide solution and then with a large volume of water. The resin was then washed with 200 ml. of a 5.7-normal aqueous sodium chloride solution and then with water until the water flowing from the bed of the resin was substantially free of chloride ions. A portion of the resin was immersed in the amount of water required to fill the voids between the resin granules, the total volume of the mixture was determined, then the water surrounding the granules was removed and its volume was measured. The ratio of the volume of water in the voids between the water-soaked granules and the absolute volume of the granules was approximately 0.36. The weight and bed volume of another portion of the water-soaked granules, free from surrounding liquor, were determined after which the granules were dried by heating them under vacuum at 65° C. for 18 hours and the weight and bed volume of the dried granules were determined. From the data which was collected it was determined that the proportion of water inside of the water-soaked granules was 30 percent by weight and 33 percent by volume. Several other portions of the water-soaked resin granules, having bed volumes of from 2.5 to 3 ml., where tested to determine the effectiveness of the composite ion exchange resin in absorbing salt from aqueous sodium chloride solutions of various concentrations. In each such test, a portion of the resin was immersed in 10 ml. of an aqueous sodium chloride solution of known concentration and the mixture was allowed to stand overnight at room temperature. This resulted in only a slight and negligible change in volume of the bed of resin. The brine surrounding the granules was then removed and analyzed to determine the amount of sodium chloride remaining dissolved therein. The difference between this amount and the amount of sodium chloride initially present in the solution is the amount of sodium chloride absorbed by the resin. In some of the tests, the bed of resin was then washed with approximately 1 liter of water and the amount of sodium chloride washed from the resin was determined. In the following table the molal concentration of sodium chloride remaining in the brine drained from the resin is given. The amount of sodium chloride absorbed by the resin and the amount of absorbed sodium chloride washed from the resin are expressed as gram moles of sodium chloride per liter of bed volume of the granular resin. The concentration of sodium chloride absorbed in the resin prior to washing the latter with water is expressed in terms of the gram moles of the absorbed sodium chloride per 1000 grams of water contained within the water-soaked resin granules, i.e. in terms of the molal concentration of the absorbed sodium chloride based on the water content of the granules. In the table, the molal concentration of sodium chloride remaining in the brine drained from the resin is referred to as "$C_1$" and the molal concentration of the sodium chloride absorbed in the resin is referred to as "$C_2$."

Table

| Test No. | $C_1$ | NaCl Absorbed By Resin | NaCl Washed From Resin | $C_2$ | Ratio of $C_2/C_1$ |
|---|---|---|---|---|---|
| 1 | 0.445 | 0.34 | 0.25 | 1.01 | 2.27 |
| 2 | 0.220 | 0.17 | 0.13 | 0.52 | 2.36 |
| 3 | 0.085 | 0.095 | 0.087 | 0.29 | 3.50 |
| 4 | 0.039 | 0.070 | (¹) | 0.21 | 5.39 |
| 5 | 0.0075 | 0.014 | (¹) | 0.43 | 5.72 |

¹ Not determined.

This experiment as a whole, and particularly tests 1–3 of the above table, show that the composite resin beads comprising the intimately associated cation- and anion-exchange resins are highly effective in absorbing a salt from an aqueous salt solution and that a major amount of the absorbed salt can be washed from the resin with water to regenerate the resin and place it in condition for re-employment.

EXAMPLE 3

An insoluble, cross-linked cation exchange resin in its acidic condition and in the form of rounded granules, or beads, of from 50 to 100 mesh sizes was used as a starting material. This resin was a nuclear sulfonated copolymer of about 92 weight percent of styrene, 4 percent ethylvinylbenzene, and 4 percent divinylbenzene. The granular resin had been soaked in water and filtered to remove the water not absorbed in the resin. To a 71 ml. bed of the granular resin was added 68 ml. of an aqueous 1.88-normal ar-vinylbenzyltrimethyl-ammonium hydroxide solution. The mixture was permitted to stand for several days. It was then agitated and was treated with sufficient of an aqueous 12-normal hydrochloric acid solution to bring it to a pH value of 6.8. Air was displaced with nitrogen from the vessel containing the mixture and 0.3 ml. of tertiary butyl peroxide was added. The vessel was closed and the mixture was heated at 75°–80° C. in contact with the atmosphere of nitrogen for 20 hours. The mixture was then permitted to stand at room temperature for several days. The vessel was opened and the resin granules were removed and were washed with 1 liter of an aqueous 5.5-normal hydrochloric acid solution and then in a stream of water for 2 days. The resin granules thus formed were insoluble composite bodies comprising the cross-linked cation exchange resin and the polymerized vinylbenzyltrimethylammonium compound intimately associated with one another. The composite resin is effective in absorbing neutral salts from aqueous solutions of the salts. The absorbed salts can be washed from the resin with water. After being regenerated by the water-washing operation the composite resin can be re-employed to absorb a further amount of salt from an aqueous salt solution.

EXAMPLE 4

In this experiment an insoluble, cross-linked anion exchange resin was employed as a starting material. The anion exchange resin was the basic form of a copolymer, of about 84 percent styrene, 8 percent ethylvinylbenzene and 8 percent divinylbenzene, containing tetramethylammonium hydroxide radicals, i.e. $-CH_2N(CH_3)_3OH$ radicals, as nuclear substituents. It was in the form of water-soaked beads of from 50 to 100 mesh sizes. To a 25 ml. bed of the granular anion exchange resin there was added a solution consisting of 2 ml. of aqueous vinylsulfonic acid of 89 weight percent concentration and 35 ml. of water. The mixture was permitted to stand at room temperature overnight and then filtered to remove unabsorbed liquid. A 22 ml. portion of the thus-treated beads was admixed with 14 ml. of water and 62 milligrams of potassium persulfate was added. The mixture was shaken for 15 minutes and 62 milligrams of potassium metasulfite was added. Nitrogen was bubbled through the mixture for 2 minutes to displace air therefrom and the vessel containing the mixture was closed. The mixture was permitted to stand for 8 hours, during which polymerization occurred, and then was heated at 90° C. for 25 minutes to complete the reactions. The vessel was opened and the mixture was removed and filtered. The granular composite resin product was washed successively with an aqueous sodium hydroxide solution, an aqueous sodium chloride solution and a large volume of water. It was tested and found to be effective in absorbing potassium iodide from an aqueous potassium iodide solution. The absorbed potassium iodide could be washed therefrom with water to regenerate the resin. The composite resin beads each consisted essentially of the insoluble, cross-linked anion exchange resin having the polyvinylsulfonic acid intimately associated, and apparently molecularly entangled, therewith.

EXAMPLE 5

An insoluble, cross-linked anion exchange resin, containing primary- and secondary-amino groups as the ion exchange radicals thereof, was employed as a starting material in this experiment. This anion exchange resin is a derivative of a copolymer of about 92 weight percent styrene, 4 percent ethylvinylbenzene and 4 percent divinylbenzene which was formed by the introduction of $H_2N-CH_2CH_2-NH-CH_2CH_2NH-CH_2-$ radicals as nuclear substituents on the copolymer molecules. The anion exchange resin starting material was in the form of small rounded granules, i.e. beads. A 605 ml. bed volume of the anion exchange resin was mixed with sufficient water to form a mixture having a total volume of 740 ml. A 100 ml. portion of glacial acrylic acid was added with stirring, whereupon the mixture warmed spontaneously to a noticeable extent. Another 75 ml. was added and the mixture was permitted to stand for several days. Another 200 ml. of water and 1.5 grams of potassium persulfate were then added and the mixture was shaken in a closed container for about 20 hours without applying heat to the same. A 1.5 gram portion of potassium metabisulfite was then added. The mixture was agitated and air was swept therefrom with nitrogen. The vessel containing the mixture was closed and allowed to stand on the shelf for about six weeks. The vessel was then opened and the resin granules were removed and washed with water. The washings were found to be free of organic carboxylic acids. The bed volume of the wet granular resin was then 970 ml. A 93 ml. portion of the granular resin was immersed in 50 ml. of an aqueous 3-normal sodium hydroxide solution and the mixture was heated at 90° C. overnight. The resin was then separated from the surrounding liquor, washed with water, and the washings were added to the liquor. The resulting solution was tested and found to contain 28 milliequivalents of a weak acid, presumably polyacrylic acid, or a salt thereof. It was calculated, by difference, that the entire mass of composite ion exchange resin granules which was thus formed contained approximately 1.18 grams equivalent weights of insolubilized polyacrylic acid intimately incorporated in the granules. The composite ion exchange resin contained an average of about 1.45 amino groups of the above-mentioned types in the anion exchange resin ingredient per carboxy group in the insolubilized polyacrylic acid ingredient. These two resin ingredients are intimately associated, and apparently are molecularly entangled, with one another.

EXAMPLE 6

A basic form of a granular, insoluble, cross-linked anion exchange resin was employed as a starting material in this experiment. Except for being in its basic form, instead of in the form of an acrylate thereof, this resin was similar to that used as a starting material in Example 2. To a 50 ml. bed of the basic anion exchange resin there was added 100 ml. of an aqueous solution ar-vinylbenzene sulfonic acid and hydrobromic acid in 0.44 and 0.27 molar concentrations, respectively. The mixture was permitted to stand at room temperature for several days. The bed volume of the resin granules was then 47 ml. A 41 ml. portion of the granules and sufficient water to fill the voids between the granules were placed in a bomb and 0.110 gram of potassium persulfate was added. Air was evacuated from the bomb and the latter was closed. The bomb was heated at 90° C. for several days. The bomb was then opened and the resin granules were removed and washed with 1 liter of an aqueous 3-normal sodium hydroxide solution. The resin granules were then treated with 75 ml. of an aqueous solution para-vinylbenzene sulfonic acid and hydrobromic acid in 0.44 molar and 0.27 molar concentrations, respectively. The mixture was permitted to stand and react for 4 hours and then was filtered. To the granular resin there were added with stirring 70 ml. of an aqueous solution of sodium paravinylbenzene sulfonate in 0.9 molar concentration and sodium bromide in 0.5 molar concentration. The mixture was permitted to stand for several days. A 0.14 gram portion of potassium persulfate was then added and the mixture was shaken in a closed container for several days. It was then heated at 90° C. for 23 hours. The vessel was opened and the resin granules were removed and separated from surrounding liquor. The composite ion exchange resin granules thus obtained contained about chemically equivalent proportions of the initial anion exchange resin and the polymerized vinynlbenzene sulfonate intimately associated, and apparently molecularly entangled, with one another in a manner preventing the polyvinylbenzene sulfonate from being dissolved and extracted from the granules by aqueous liquids contacted therewith. The resin ingredients of the composite granules functioned as anion- and cation-exchange resins, respectively. The granules, after being washed thoroughly with an aqueous sodium chloride solution and with water are effective in absorbing sodium iodide from an aqueous sodium iodide solution. The absorbed sodium iodide can be washed from the granules with water and the granules thus be regenerated.

EXAMPLE 7

The acidic form of an insoluble, cross-linked, nuclear sulfonated copolymer of about 84 weight percent styrene, 8 percent ethylvinyl benzene, and 8 percent divinylbenzene, was employed as a starting material. This cation exchange resin was in the form of beads of from 20 to 50 mesh sizes. A 131 ml. bed of the resin was reacted with 210 ml. of an aqueous 1.003-normal sodium hydroxide solution for 15 minutes and then the mixture was filtered. To the beads there were added with stirring 50 ml. of water and 45 grams of an aqueous 43 weight percent ethylenimine solution. The mixture was heated on a steam bath for 26 hours, during which time its temperature initially rose to 95° C. and thereafter decreased to, and remained at, about 85° C. The beads were then separated from the surrounding liquor and were washed with water. The washings and said liquor were found to contain a total of about 0.195 gram equivalent weight of dissolved polyethylenimine. Apparently, 0.45 gram equivalent weight of polyethylenimine was formed within the resin granules and was thereby insolubilized. The composite resin granules were tested and found to contain a chemical excess of sulfonate groups over amino groups, i.e. it apparently contained and average of about 1.2 sulfonate groups per amino group of the insolubilized polyethylenimine. A 92 ml. portion of the composite ion exchange resin granules was washed successively with 20 ml. of an aqueous 1-normal sodium hydroxide solution and 50 ml. of water. This portion of the granules was then stirred together with 25 ml. of water and 18 grams of an aqueous 43 weight percent ethylenimine solution, whereupon the temperature rose spontaneously to 52° C. in a few minutes. The mixture was then heated at 85° C., for 1 hour. It was next filtered and the resin granules were washed with water. The resin granules thus obtained were alternately washed several times with aqueous salt solutions and with water. The granular composite resin product was tested and found to contain an average of about 1.18 amino group in the insolubilized polyethylenimine ingredient thereof per sulfonate group in the insoluble cation exchange resin ingredient. The composite ion exchange resin is effective in absorbing neutral salts from aqueous salt solutions. The absorbed salts can be washed from the composite resin with water to regenerate the resin bodies.

EXAMPLE 8

An insoluble, cross-linked cation exchange resin in its acidic, or hydrogen, form was used as a starting material in this experiment. This resin was a nuclear sulfonated copolymer of about 92 weight percent styrene, 4 percent ethylvinylbenzene and 4 percent divinylbenzene. It was in the form of water-soaked beads of from 50 to 100 mesh sizes. A 100 ml. portion of these beads was chemically equivalent to 0.16 gram mole of sodium hydroxide. To a mixture of 300 ml. of the cation exchange resin beads in about 500 ml. of water there was added 50 ml. (0.48 gram mole) of 4-vinylpyridine. The mixture warmed spontaneously to a slight, but noticeable, extent. The mixture was shaken overnight and the beads were then separated from the surrounding liquid. The bed volume of the beads was then 227 ml. To a mixture of 200 ml. of the thus-treated beads and 200 ml. of water there were successively added 1 ml. of an aqueous 0.1-normal ferrous ammonium sulfate solution and 2 ml. of an aqueous 30 weight percent hydrogen peroxide solution. The mixture was shaken and then allowed to stand in a closed vessel for 65 hours. The mixture was then heated at 85° C. for 15 minutes, after which the vessel was opened and the granular composite resin product was separated by filtration. The product was washed with an aqueous 4-normal nitric acid solution and then with water. It was then tested and found to contain an average of about 0.8 amino group in the polyvinylpyridine ingredient thereof per sulfonate radical in the insoluble, cross-linked cation exchange resin ingredient. These two ingredients were intimately associated, and apparently molecularly entangled, in a manner which prevented the polyvinylpyridine from being dissolved or extracted from the granules by the aqueous acid solution. The composite ion exchange resin product is effective in extracting neutral salts, e.g. potassium iodide, from aqueous salt solutions. The absorbed salts can be washed therefrom with water to regenerate the composite ion exchange resin granules.

EXAMPLE 9

Sufficient water was added to a 400 ml. bed of a granular anion exchange resin, similar to that used as a starting material in Example 4, to fill the voids between the granules. To the resulting mixture there were added 100 ml. of water, 150 ml. of glacial methacrylic acid and 1 gram of potassium persulfate. The mixture was shaken in a closed vessel for 16 hours. The vessel was then opened and 1 gram of potassium metabisulfite was added. The vessel was closed and the mixture was shaken and then allowed to stand. It warmed spontaneously to moderately elevated temperatures not higher than 50° C. On 5 hours of standing, the liquid in the mixture had thickened to a gel. The mixture was then heated to about 85° C. for 1 hour, after which 400 ml. of a 7-normal aqueous sodium hydroxide solution was added. The mixture was shaken for several hours. The resulting mixture of liquid and granular materials was filtered. The granular material was admixed with 700 ml. of a 2.4-normal aqueous sodium hydroxide solution and the mixture was heated overnight on a steam bath. Most of the solid polymeric material was then in the form of individual granules but a few aggregates, of granules bonded together, remained. Most of these were separated into individual granules by a further treatment with an aqueous sodium hydroxide solution. The granular resin product was screened to remove any remaining granule aggregates. Only a small amount, i.e. less than 0.5 gram, of granule aggregates remained and they were discarded. The mass of individual granules thus obtained was washed successively with 3 liters of a 2-normal aqueous sodium chloride solution and about 2 liters of water. The bed of wet granules then had a volume of 680 ml. The individual granules were composites of the anion exchange resin employed as a starting material and polymethacrylic acid. The granular product was tested to determine the proportions of basic and acidic radicals therein. A 1 liter bed of the granular resin was found to contain quaternary ammonium radicals in amount sufficient to react with 0.74 mole of hydrochloric acid and carboxy groups in amount sufficient to react with 1.03 gram mole of sodium hydroxide. In this sense, the granular composite resin product contains quaternary ammonium radicals in 0.74 molar concentration and carboxy radicals in 1.03 molar concentration.

EXAMPLE 10

A granular anion exchange resin was used in this experiment. It was a copolymer, of about 84 percent styrene, 8 percent ethylvinylbenzene and 8 percent divinylbenzene, having trimethylethanolammonium hydroxide groups, i.e., $$-CH_2N(-CH_3)_2(-CH_2CH_2OH)OH$$

groups, as substituents on the aromatic nuclei thereof. It was in the form of water-soaked, rounded granules of from 20 to 50 mesh sizes. To a 365 ml. bed of this anion exchange resin sufficient water was added to fill the spaces between the granules. There were then added 60 ml. of water, 55 ml. of glacial methacrylic acid, and 0.8 gram of potassium persulfate. The mixture was shaken in a closed vessel for 9 hours. The vessel was then opened and 0.8 gram of potassium metabisulfite was added to the mixture. The vessel was closed, shaken for a few minutes and permitted to stand for 38 hours. The liquid of the mixture was then somewhat more viscous than water alone. To the mixture there were added 500 ml. of a 4-normal aqueous sodium hydroxide solution. The resulting mixture was heated at about 85° C. to 10 hours. It was next filtered and the granular resin product was washed successively with 3 liters of a 2.5-normal aqueous sodium chloride solution and 10 liters of water. The product then had a bed volume of 355 ml. The resin granules were composites of the anion exchange resin starting material and the polymerized methacrylic acid intimately associated with one another. The product was tested and found to contain quaternary ammonium radicals in 0.85 molar concentration and carboxy group in 0.70 molar concentration. The molar concentrations of ionizable groups in the composite resin carry the meaning indicated in Example 9.

I claim:

1. A solid composite ion exchange resin body, each individual piece of which consists essentially of a mixture of (1) an insoluble, cross-linked, organic resinous polymer having ion exchanging groups thereon as substituents, and (2) a polymer different than (1) and selected from the group consisting of (a) polyethyleneimine and (b) polymerized monoethylenically unsaturated monomers, which monomers contain ion exchanging substituent groups, the ingredients just mentioned being mechanically inseparable from one another, said composite resin body being prepared by a method which consists essentially in imbibing, i.e. absorbing, into the interstices of granules of the insoluble, cross-linked, ion exchange group containing poymer (1), the ion exchanging group containing monomer selected from those consisting of (2)(a) and (2)(b) above, and polymerizing said ion exchanging group containing monomer while it is absorbed in situ in said cross-linked copolymer's interstices by subjecting same to polymerization conditions.

2. A solid composite ion exchange resin body, as claimed in claim 1, an individual piece of which solid composite ion exchange resin body is composed of, as the esesntial and ionizable components selected from the groups (1), (2)(a), and (2)(b) of claim 1, from 0.5 to 2 chemical equivalents of an anion exchanging resinous material and one chemical equivalent of a cation exchanging resinous material.

3. A solid composite ion exchange resin body, each individual piece of which consists essentially of from 0.5 to 2 chemical equivalents of a solid insoluble, copolymer of a major proportion of at least one monoalkenyl aromatic hydrocarbon and a minor proportion of divinylbenzene, which copolymer possesses ion-exchanging basic nitrogen-containing radicals as nuclear substituents thereon and, intimately associated therewith, one chemical equivalent of a cation exchange resin the components just-mentioned being mechanically inseparable from one another, said composite ion exchange resin body being one prepared by a method which consists essentially in imbibing, i.e. absorbing, into the interstices within an individual piece of a solid insoluble copolymer of a major proportion of at least one monoalkenyl aromatic hydrocarbon and a minor proportion of divinylbenzene, which copolymer possesses ion-exchanging basic nitrogen-containing radicals as nuclear substituents thereon, a monoethylenically unsaturated organic monomeric material that contains cation-exchanging group in the molecules thereof and that is polymerizable to form a polymer different from, and in intimate mixture with, the solid, insoluble aromatic resin initially present, and polymerizing the monomeric material while it is absorbed in the resin initially present, and said composite ion exchange resin body being capable, after becoming spent by chemical absorption of ions from an aqueous solution contacted therewith, of being regenerated by washing the same with water.

4. A solid, composite ion exchange resin body, each individual piece of which consists essentially of from 0.5 to 2 chemical equivalents of an insoluble, cross-linked copolymer of a major proportion of styrene and minor proportions of ethylvinylbenzene and divinylbenzene, which copolymer possesses quaternary ammonium radicals as nuclear substituents thereon, and one chemical equivalent of polyacrylic acid the ingredients just-mentioned being mechanically inseparable from one another, said composite ion exchange resin body being one prepared by a method which comprises inbibing, i.e. absorbing, into the interstices within an individual piece of a solid, insoluble aromatic resin an organic material that is polymerizable to form a polymer different from the solid, insoluble aromatic resin initially present, and polymerizing the monomeric material while it is absorbed in the resin initially present, and said composite ion exchange resin body being capable, after becoming spent by chemical absorption of ions from an aqueous solution contacted therewith, of being regenerated by washing the same with water.

5. A solid, composite ion exchange resin body, consisting essentially of from 0.5 to 2 chemical equivalents of an insoluble, cross-linked copolymer of a major proportion of styrene and minor proportions of ethylvinylbenzene and divinylbenzene, which copolymer possesses

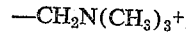
—CH$_2$N(CH$_3$)$_3^+$ radicals as nuclear substituents thereon and, in intimate mixture together therewith, one chemical equivalent of an ion-exchanging component selected from the class consisting of polyacrylic acids and salts thereof the ingredients just-mentioned being mechanically inseparable from one another, said composite ion exchange resin body being one prepared by a method which comprises inbibing, i.e. absorbing, into the interstices within an individual piece of a solid, insoluble aromatic resin an organic material that is polymerizable to form a polymer different from the solid, insoluble aromatic resin initially present, and polymerizing the monomeric material while it is absorbed in the resin initially present, and said composite ion exchange resin body being capable, after becoming spent by chemical absorption of ions from an aqueous solution contacted therewith, of being regenerated by washing the same with water.

6. A solid, composite ion exchange resin body, consisting essentially of from 0.2 to 2 chemical equivalents of an insoluble, cross-linked copolymer of a major proportion of styrene and minor proportions of ethylvinylbenzene and divinylbenzene, which copolymer possesses

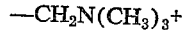
—CH$_2$N(CH$_3$)$_3^+$ radicals as nuclear substituents thereon and, in intimate mixture together therewith, one chemical equivalent of an ion-exchanging component selected from the class consisting of polymethacrylic acids and salts thereof the ingredients just-mentioned being mechanically inseparable from one another, said composite ion exchange resin body being one prepared by a method which comprises inbibing, i.e. absorbing, into the interstices within an individual piece of a solid, insoluble aromatic resin an organic material that is polymerizable to form a polymer different from the solid, insoluble aromatic resin initially present, and polymerizing the monomeric material while it is absorbed in the resin initially present, and said composite ion exchange resin body being capable, after becoming spent by chemical absorption of ions from an aqueous solution contacted therewith, of being regenerated by washing the same with water.

7. A solid, composite ion exchange resin body, consisting essentially of from 0.2 to 2 chemical equivalents of an insoluble, cross-linked copolymer of a major proportion of styrene and minor proportions of ethylvinylbenzene and divinylbenzene, which copolymer possesses —$CH_2N(CH_3)_2CH_2CH_2OH^+$ radicals as nuclear substituents thereon and, in intimate mixture together therewith, one chemical equivalent of an ion-exchanging component selected from the class consisting of polymethacrylic acids and salts thereof the ingredients just mentioned being mechanically inseparable from one another, said composite ion exchange resin body being one prepared by a method which comprises imbibing, i.e. absorbing, into the interstices within an individual piece of a solid, insoluble aromatic resin an organic material that is polymerizable to form a polymer different from the solid, insoluble aromatic resin initially present, and polymerizing the monomeric material while it is absorbed in the resin initially present, and said composite ion exchange resin body being capable, after becoming spent by chemical absorption of ions from an aqueous solution contacted therewith, of being regenerated by washing the same with water.

8. A solid, composite ion exchange resin body consisting essentially of one chemical equivalent of an insoluble, cross-linked, nuclear sulfonated copolymer of a major proportion of styrene and minor proportions of ethylvinylbenzene and divinylbenzene and from 0.5 to 2 chemical equivalents of a polymerized vinylbenzyltrimethylammonium compound intimately associated with said sulfonated copolymer the ingredients just-mentioned being mechanically inseparable from one another, said composite ion exchange resin body being one prepared by a method which comprises imbibing, i.e. absorbing, into the interstices within an individual piece of a solid, insoluble aromatic resin an organic material that is polymerizable to form a polymer different from the solid, insoluble aromatic resin initially present, and polymerizing the monomeric material while it is absorbed in the resin initially present, and said composite ion exchange resin body being capable, after becoming spent by chemical absorption of ions from an aqueous solution contacted therewith, of being regenerated by washing the same with water.

References Cited in the file of this patent

UNITED STATES PATENTS

| | | |
|---|---|---|
| 2,461,505 | Daniel | Feb. 15, 1949 |
| 2,593,417 | D'Alelio | Apr. 22, 1952 |
| 2,678,307 | Ferris | May 11, 1954 |
| 2,794,785 | D'Alelio | June 4, 1957 |
| 2,837,496 | Vandenberg | June 3, 1958 |

FOREIGN PATENTS

| | | |
|---|---|---|
| 728,508 | Great Britain | Apr. 20, 1955 |
| 681,411 | Great Britain | Oct. 22, 1952 |

OTHER REFERENCES

Hatch et al.: Ind. Eng. Chem., 49, 1812–1819 (1957).
"Ion Retardation," Dow Chemical Co. Bulletin 164–62.